United States Patent Office 3,391,119
Patented July 2, 1968

3,391,119
NONCONJUGATED PERHALOFLUORO-β-KETO-
ω-ALKENES AND THEIR POLYMERS
Burton C. Anderson, Wilmington, Del., assignor to E. I.
du Pont de Nemours and Company, Wilmington, Del.,
a corporation of Delaware
No Drawing. Filed Feb. 7, 1966, Ser. No. 525,379
9 Claims. (Cl. 260—63)

ABSTRACT OF THE DISCLOSURE

Nonconjugated chloroperfluoro- and perfluoro-β-keto-ω-alkenes prepared by dehalogenation of chloroperfluoro- and perfluoro-β-keto-ω-alkene chlorides can be polymerized into polymers and copolymers with other polymerizable olefins useful as plasticizers and in the form of self-supporting films.

DESCRIPTION OF THE INVENTION

This invention relates to nonconjugated perfluoroketoalkenes and perchlorofluoroketoalkenes, to the preparation thereof, and to the polymers thereof.

More specifically, the monomeric compounds of this invention relate to the nonconjugated perfluoro-β-keto-ω-alkenes and chloroperfluoro-β-keto-ω-alkenes of the general formula $$CF_3\overset{O}{\overset{\|}{C}}CF_2(CFX)_nCF=CF_2$$

wherein X is a member selected from the class consisting of fluorine and chlorine and $n$ is an integer from 0–9, inclusive; with the proviso that when $n$ is 1, X is fluorine and when $n$ is 2–9, inclusive, at least 50% of the X groups are fluorine and with the further proviso that any chlorine-bearing atom is at least one carbon removed from the terminal trifluorovinyl group and from any other chlorine-bearing atom.

This invention also relates to the process for producing the above monomeric compounds of this invention and to polymers and copolymers thereof with copolymerizable monomers represented by the formula $R^1CF=CR^2R^3$ wherein $R^1$, $R^2$ and $R^3$ can be the same or different and are members selected from the class consisting of hydrogen, fluorine, chlorine and bromine.

The first member of this class of the monomeric compounds of this invention where $n=0$, is 4-ketoperfluoropentene-1. The second member of this class of monomeric compounds of this invention where $n=1$, is 5-ketoperfluorohexene-1. The third and fourth members of the class of the monomeric compounds of this invention where $n=2$ are 4-chloro-6-ketoperfluoroheptene-1 and 6-ketoperfluoroheptene-1. Other members of the class of the monomeric compounds of this invention will be given later.

The process of this invention for the preparation of the nonconjugated β-keto-ω-alkenes of this invention is represented by the folowing equations:

(1)
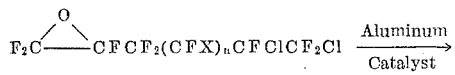$CFCF_2(CFX)_nCFClCF_2Cl \xrightarrow[\text{Catalyst}]{\text{Aluminum}}$ $$CF_3\overset{O}{\overset{\|}{C}}CF_2(CFX)_nCFClCF_2Cl$$

(2)
$$CF_3\overset{O}{\overset{\|}{C}}CF_2(CFX)_nCFClCF_2Cl \xrightarrow{Zn} CF_3\overset{O}{\overset{\|}{C}}CF_2(CFX)_nCF=CF_2$$

Equation 1 represents an aluminum trichloride, alumina, or hydrated alumina catalyzed rearrangement of perfluoro-α,β-epoxy-ψ,ω-dichloroalkanes and perchlorofluoro-α,β-epoxy-ψ,ω-dichloroalkanes into β-ketoperfluoro- and β-ketoperchlorofluoro-ψ,ω-dichloroalkanes. Equation 2 represents a dehalogenation reaction to give the monomeric compounds of this invention.

The first step of the process is carried out by bringing the epoxy reactant in contact with a reaction promoter or catalyst which is aluminum trichloride or an aluminum oxide. The latter can be any form of anhydrous or hydrated alumina, but acidic, substantially anhydrous forms of alumina such as α-alumina (corundum) and γ-alumina are preferred. The reaction is conducted in a temperature range of 0–250° C. Depending on the reaction conditions, the aluminum compound is used in catalytic or greater amounts, for example, in amounts of 0.005–0.5 mole, preferably 0.01–0.25 mole, per mole of epoxy compound, these low ratios being used in particular when the reaction is conducted in the liquid phase; or it can be used in massive amounts, up to a large excess relative to the epoxy compound, especially when the reaction takes place in the vapor phase.

When operating in the liquid phase, no solvent or reaction medium is generally used. If desired, however, inert liquid media, i.e., solvents or diluents that do not react with the reactant epoxide, with the ketone reaction product, or with the catalyst can be used. Examples of such reaction media are liquid sulfur dioxide, alkyl sulfones such as diethyl sulfone, ethers such as diethyl ether, methyl isopropyl ether, dioxane, tetrahydrofuran and ethylene glycol dimethyl ether, ketones such as acetone, methyl ethyl ketone and methyl isopropyl ketone, and nitriles such as acetonitrile and benzonitrile.

The liquid phase reaction takes place at temperatures as low as 0° C. or even lower. It is, in fact, exothermic initially, especially when using aluminum chloride. It is most conveniently carried out at ambient or slightly elevated temperatures, e.g., 25–50° C., but higher temperatures up to about 150° C. can be used. The pressure used is not critical. Atmospheric pressure is used whenever possible but the reaction can be conducted in sealed vessels under autogenous or higher pressures. The time required for the reaction varies with the temperature and with the nature and amount of catalyst employed.

The vapor phase reaction can be carried out by passing the vapors of the perfluoro- or perchlorofluoro-α,β-epoxy-ψ,ω-dichloroalkene over a bed of catalyst maintained at the desired temperature, condensing the reaction product and recycling it if necessary. Reaction zone temperatures between about 50° and 250° C., preferably between 75 and 200° C., are generally used. The reaction can be conducted at atmospheric, subatmospheric or superatmospheric pressure, and inert diluent or carrier gases such as nitrogen or argon can be employed.

The second step of the process, the dechlorination of the perhalofluoro-β-keto-ψ,ω-dichloroalkane, resulting from the first step of this invention, consists of reacting said compound with at least a stoichiometric amount of zinc, and preferably an excess thereover.

A reaction medium such as the oxygen-containing organic liquids commonly used in dehalogenation reactions can be used. Examples of reaction media used are the acyclic or cyclic ethers such as diethyl ether, di-n-butyl ether, 1,2-dimethoxyethane, β,β'-dimethoxydiethyl ether, tetrahydrofuran and dioxane, and of these, the last named is preferred.

The dechlorination reaction is slow at ambient temperatures; it is preferably carried out at temperatures between 50 and 125° C., at atmospheric, subatmospheric or superatmospheric pressures. The resulting nonconjugated perhalofluoro-β-keto-ω-alkene is separated from the medium by fractional distillation and/or chromatographic methods. These products can be distilled without decomposition, and they exhibit the low boiling points characteristic of perfluorinated compounds.

The monomeric compounds of this invention can be polymerized to homopolymers and copolymerized to copolymers, with copolymerizable monomers having the general formula $R^1FC=CR^2R^3$ wherein $R^1$, $R^2$, and $R^3$ are selected from members of the class consisting of hydrogen, fluorine, chlorine and bromine. The characteristics of the homopolymers and copolymers produced are dependent upon the monomers used in the polymerization and the molecular weight of the polymer produced. Depending upon these variables, these polymers can be hard or elastomeric solids or oils or heavy greases.

The polymerization can be effected by heating the monomeric compounds, with or without copolymerizable monomers, to temperatures of the order of 100°–300° C. under high pressures of at least 3000 atmospheres. The monomers can also be polymerized or copolymerized upon exposure to a free radical-generating source. Under such conditions, polymerization takes place even at subnormal temperatures, e.g., 0° C., although temperatures in the range of 10°–100° C. are preferred. One method of generating free radicals consists in exposing the monomeric compounds to ultraviolet light, i.e., light of wavelength in the range of about 1800 to 3800 A. units. If desired, this may be done in the presence of one of the known photopolymerization initiators such as biacetyl, benzoin, benzoin alkyl ethers, and the like.

Another source of free radicals is found in the well-known free radical-producing polymerization initiators, including, for example, the diacyl peroxides such as diacetyl peroxide and dibenzoyl peroxide; the dialkyl peroxides such di-tert-butyl peroxide, the persalts such as the ammonium and alkali metal persulfates, perborates and percarbonates; the azonitriles, such as 2,2-azobisisobutyronitrile and others described in U.S. Patent 2,471,959; dinitrogen difluoride; and other addition polymerization catalysts. Such agents are used in catalytic amounts, e.g., between 0.001 and 0.05 mole per mole of total polymerizable material.

Another free radical-generating source which can be used is the various forms of ionizing radiation, wherein said radiation has sufficient energy to remove an electron from a gaseous atom, forming an ion pair. The required energy is of the order of at least 50 electron-volts.

Examples of the copolymerizable monomers used to form copolymers are vinyl fluoride, vinylidene fluoride, bromotrifluoroethylene, chlorotrifluoroethylene, 1,2-dichloro-1,2-difluoroethylene, 1-bromo-1,2-difluoroethylene, tetrafluoroethylene, 1-chloro - 2,2 - difluoroethylene, 1,1-dichloro-2-fluoroethylene, 1-chloro-1-fluoroethylene, etc. Depending on the relative proportions and copolymerizability of the comonomers, copolymers containing variable amounts of the ketone component can be obtained. In general, the copolymers contain between 1 and 75 percent by weight, and usually between 10 and 75 percent, of polymerized nonconjugated perfluoro- and perchlorofluoro-β-keto-ω-alkene.

Polymerization takes place through the terminal trifluorovinyl group. The homopolymers and copolymers are therefore characterized by the presence of pendant 2-keto-pentafluoropropyl groups, i.e., $-CF_2-CO-CF_3$ groups, attached to the main polymer chain, containing recurring units, either directly or through a perhalofluoro carbon, $-(CFX)_n$ group.

The perhalofluoro-α,β-epoxy-ψ,ω-dichloroalkane starting materials used in Step 1 of the above process are prepared by oxidation of the corresponding terminally unsaturated perhalofluoroalkenes, as represented in the equation:

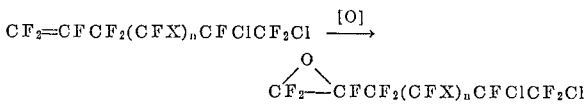

This epoxidation reaction may be carried out, in accordance with known methods, by treatment of the perhalofluoroalkene with hydrogen peroxide in mixtures of water and methanol kept basic by addition of potassium hydroxide, or by direct oxidation with oxygen catalyzed by ultraviolet light. The primary starting materials, i.e., the terminally unsaturated perhalofluoroalkenes may be prepared by methods described by the literature or by extensions of these methods. Three general synthetic methods may be used to prepare these products.

(a) Where X is fluorine and $n$ is an odd integer from 1–9, the desired product can be obtained by a telomerization process involving 1,2 - dichloro - 1,1,2-trifluoro-2-iodoethane, tetrafluoroethylene and trifluoroethylene, followed by dehydrohalogenation, in accordance with the reaction sequence:

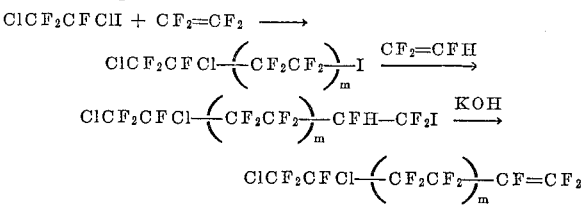

($m=$1, 2, 3, 4 or 5).

This method is described for $m=1$ by A. T. Lilyquist, Ph.D. Thesis, University of Florida, 1960.

(b) Where X is fluorine and $n$ is an even integer from 2–8, a similar method may be used, starting with perfluoroallyl iodide and involving an additional chlorination step, as shown in the following equations:

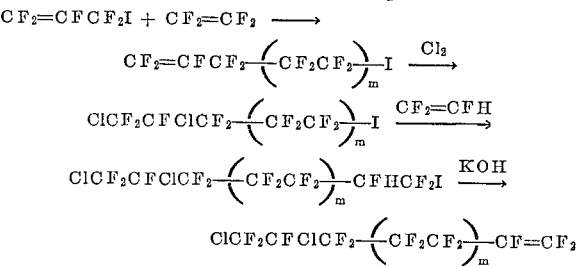

($m=$1, 2, 3, or 4).

(c) Where up to 50% of the X groups are Cl and $n$ is 2, 4, 6 or 8, the starting material can be prepared by pyrolytic decarboxylation of the sodium salts of the appropriate fluorochloroalkanoic acids. This method is described in A. M. Lovelace, D. A. Rausch and A. M. Postelnek, Aliphatic Fluorine Compounds, Reinhold, New York, p. 107.

Perhalofluoro-α,β-epoxy-ψ,ω-dichloroalkanes which can be prepared by the above-described method and serve as starting materials in the process of this invention include: 1,2-epoxy-4,5-dichloroperfluoropentane, 1,2-epoxy-5,6-dichloroperfluorohexane, 1,2 - epoxy-6,7-dichloroperfluoroheptane, 1,2-epoxy-7,8-dichloroperfluorooctane, 1,2-epoxy-4,6,7 - trichloroperfluoroheptane, 1,2-epoxy-4,6,8,9-tetrachloroperfluorononane, 1,2-epoxy-9,10-dichloroperfluorodecane, 1,2 - epoxy-4,6,8,10,11-pentachloroperfluoroundecane, 1,2 - epoxy-11,12-dichloroperfluorododecane, 1,2-epoxy - 12,13 - dichloroperfluorotridecane, 1,2 - epoxy-4,6,8,10,12,13 - hexachloroperfluorotridecane, and 1,2-epoxy-13,14-dichloroperfluorotetradecane.

The following examples further illustrate the invention in greater detail.

Example 1

PART I.—PREPARATION OF 4,5-DICHLOROPER-FLUOROPENTANONE-2

A 25-ml., round-bottom flask fitted with a stirrer and a condenser protected by a drying tube was charged with 20 g. of 1,2-epoxy-4,5-dichloroperfluoropentane and 0.1 g. of aluminum chloride. The reaction was exothermic at first. When the heat evolution had subsided, the reaction mixture was stirred for 21 hours at room temperature, after which the aluminum chloride was separated by filtration and the filtrate was distilled in a small spinning band still. There was obtained 16.7 g. or 83% of the theory of 4,5-dichloroperfluoropentanone-2, B.P. 88–90° C. Analysis of a center cut, B.P. 89.5° C., showed it to be the pure material.

*Analysis.*—Calcd. for $C_5Cl_2F_8O$: F, 50.84; Cl, 23.72. Found: F, 51.18; Cl, 23.89.

The infrared spectrum of the ketone showed a carbonyl band at $5.6\mu$ and no epoxide remained as judged by disappearance of the band at $6.4\mu$.

PART II.—PREPARATION OF 4-KETOPERFLUOROPENTENE-1

A 500-ml., 4-necked flask fitted with a stirrer, a pressure-equalized dropping funnel, a condenser, and a thermometer was dried in an oven overnight, assembled while hot, and cooled in a stream of dry nitrogen. The outlet of the condenser was connected to a Dry-Ice cooled trap. In the flask were placed 100 g. of zinc, which had been activated by washing with 4% hydrochloric acid and dried in a vacuum oven at 140° C. overnight, and 100 ml. of sodium-dried dioxane. The mixture was stirred and heated under reflux with hot water (55° C.) in the condenser, and 50 ml./min. of nitrogen was passed through the pressure-equalized dropping funnel into the flask and out through the Dry-Ice cooled trap. 4,5-dichloroperfluoropentanone-2, 14.5 g., was added from the dropping funnel during 42 minutes, and the reaction mixture was refluxed for another 57 minutes. At the end of this time, 3.1 ml. of product had collected in the Dry-Ice cooled trap. This material was distilled in a microcolumn and there was obtained 2.88 g. of 4-ketoperfluoropentene-1, B.P. 38–41° C.

*Analysis.*—Calcd. for $C_5F_8O$: F, 66.66. Found: F, 66.30.

Infrared absorption at $5.57\mu$ represented both carbonyl and trifluorovinyl groups. The $F^{19}$ N.M.R. spectrum was in accord with the structure and the spectrum of the fluorine atom on carbon atom 2 was especially characteristic since the coupling constants of the two other vinyl fluorines, the difluoromethylene and the trifluoromethyl group, were readily determined from this part of the spectrum. On treatment with water, the ketone readily forms a hydrate stable up to about 100° C.

Example 2

HOMOPOLYMERIZATION OF 4-KETOPERFLUOROPENTENE-1

A small platinum ampoule was charged with 4-ketoperfluoropentene-1, then flattened at the top and clamped in a vise. The portion of the tube below the vise was cooled in a Dry Ice-acetone mixture, and the top of the tube was welded shut. The ampoule, containing 0.074 g. of material, was packed in the reaction space of a 1-inch tetrahedral anvil device and subjected to a pressure of 65,000 atmospheres at 200° C. for 3 hours. When opened, the ampoule contained a clear, solid polymer.

Example 3

COPOLYMERIZATION OF 4-KETOPERFLUOROPENTENE-1 AND TETRAFLUOROETHYLENE

A ⅜-inch platinum tube was charged with 2.5 g. of 4-ketoperfluoropentene-1 and 2.5 g. of uninhibited tetrafluoroethylene. The tube was cooled in liquid nitrogen, evacuated, and 1 ml. of dinitrogen difluoride gas was added. The tube was clamped in a vise and while the part below the vise was cooled in liquid nitrogen the top of the tube was sealed by welding. The tube was placed in a pressure vessel, subjected to an external pressure of 3000 atmospheres, heated slowly to 70° C. and maintained at that temperature and pressure for 8 hours. There was obtained 2.1 g. of polymer after removal of the volatile materials by evaporation at 0.1 mm. pressure for about 16 hours. Infrared examination of this product showed that it was a copolymer of tetrafluoroethylene and 4-ketoperfluoropentene-1 since absorption at $5.6\mu$ was noted. Differential thermal analysis showed on the first heating an exothermic decomposition at about 305° C. and on second heating an endothermic melting point in this region. It was estimated on the basis of extraneous bands in the infrared spectrum that the copolymer contained 5 mole percent, or about 11% by weight, of 4-ketoperfluoropentene-1.

Example 4

PART I.—PREPARATION OF 4,6,7-TRICHLOROPER-FLUOROHEPTANONE-2

A 300-ml., round-bottom flask fitted with a stirrer, a thermometer and a condenser protected by a drying tube was charged with 177 g. of 1,2-epoxy-4,6,7-trichloroperfluoroheptane (containing about 20% of unreacted 4,6,7-trichloroperfluoroheptene-1). The stirrer was started and 1.0 g. of anhydrous aluminum chloride was added. After 0.5 hour, a second 1-g. portion of aluminum chloride was added, followed by a third and a fourth portion 1 and 3 hours later, respectively. The temperature of the exothermic reaction was kept below 50° C. by external cooling when necessary. Three hours after the final addition, the reaction was stopped and the aluminum chloride was removed by filtration. Distillation of the filtrate in a small spinning band still gave 132 g. of reaction product, B.P. 64–72° C. at 26 mm. This material still contained some impurities and a sample was purified by gas chromatography and subsequent distillation to give pure 4,6,7-trichloroperfluoroheptanone-2, B.P. 68° C. at 24 mm.

*Analysis.*—Calcd. for $C_7Cl_3F_{11}O$: Cl, 25.60; F, 50.30. Found: Cl, 26.03; F, 50.32.

PART II.—PREPARATION OF 4-CHLORO-6-KETOPERFLUOROHEPTENE-1

Using the apparatus and procedure described in Example 1, Part II, a mixture of 150 g. of activated zinc and 150 ml. of sodium-dried 1,2-dimethoxyethane was heated at 100° C. and 100 g. of 4,6,7-trichloroperfluoroheptanone-2 was added during about 2 hours. The reaction was continued for an additional 2 hours, at the end of which time 7.8 ml. of reaction product had collected in the Dry Ice cooled trap. This material, B.P. 96°–101° C., was purified by gas chromatography and again distilled in a microcolumn to give 4-chloro-6-ketoperfluoroheptene-1, B.P. 98° C.

*Analysis.*—Calcd. for $C_7ClF_{11}O$: Cl, 10.29; F, 60.67. Found: Cl, 10.69; F, 62.85.

The infrared spectrum showed both carbonyl and double bond absorption at $5.58\mu$. The $F^{19}$ N.M.R. spectrum was in accord with the structure.

The described process of monomer preparation is applicable to the preparation of any perhalofluoro-β-keto-ω-alkene having the general formula previously set forth. Other products of this invention are listed in the table which follows, in which the first column shows the epoxyperhaloalkane starting material; the second column shows the intermediate β-ketoperhaloalkane obtained by rearrangement in the presence of aluminum chloride or aluminum oxide of the corresponding product of the first column; and the third column shows the final product, i.e., the perhalo-β-keto-ω-alkene obtained by dechlorination with zinc of the corresponding product of the second column.

TABLE I

| | Epoxyperhaloalkane | β-Ketoperhaloalkane | Perhalo-β-keto-ω-alkene |
|---|---|---|---|
| 1 | 1,2-epoxy-5,6-dichloroperfluorohexane, $\overset{O}{\overset{\diagup\diagdown}{CF_2-CF}}(CF_2)_2CFClCF_2Cl$ | 5,6-dichloroperfluorohexanone-2, $CF_3CO(CF_2)_2CFClCF_2Cl$ | 5-ketoperfluorohexene-1, $CF_3CO(CF_2)_2CF=CF_2$ |
| 2 | 1,2-epoxy-6,7-dichloroperfluoroheptane, $\overset{O}{\overset{\diagup\diagdown}{CF_2-CF}}(CF_2)_3CFClCF_2Cl$ | 6,7-dichloroperfluoroheptanone-2, $CF_3CO(CF_2)_3CFClCF_2Cl$ | 6-ketoperfluoroheptene-1, $CF_3CO(CF_2)_3CF=CF_2$ |
| 3 | 1,2-epoxy-7,8-dichloroperfluorooctane, $\overset{O}{\overset{\diagup\diagdown}{CF_2-CF}}(CF_4)_4CFClCF_2Cl$ | 7,8-dichloroperfluorooctanone-2, $CF_3CO(CF_2)_4CFClCF_2Cl$ | 7-ketoperfluorooctene-1, $CF_3CO(CF_2)_4CF=CF_2$ |
| 4 | 1,2-epoxy-4,6,8,9-tetrachloroperfluorononane, $\overset{O}{\overset{\diagup\diagdown}{CF_2-CF}}CF_2(CFClCF_2)_2CFClCF_2Cl$ | 4,6,8,9-tetrachloroperfluorononanone-2, $CF_3COCF_2(CFClCF_2)_2CFClCF_2Cl$ | 8-keto-4,6-dichloroperfluorononene-1, $CF_3COCF_2(CFClCF_2)_2CF=CF_2$ |
| 5 | 1,2-epoxy-9,10-dichloroperfluorodecane, $\overset{O}{\overset{\diagup\diagdown}{CF_2-CF}}(CF_2)_6CFClCF_2Cl$ | 9,10-dichloroperfluorodecanone-2, $CF_3CO(CF_2)_6CFClCF_2Cl$ | 9-ketoperfluorodecene-1, $CF_3CO(CF_2)_6CF=CF_2$ |
| 6 | 1,2-epoxy-4,6,8,10,11-pentachloroperfluoroundecane, $\overset{O}{\overset{\diagup\diagdown}{CF_2-CF}}CF_2(CFClCF_2)_3CFClCF_2Cl$ | 4,6,8,10,11-pentachloroperfluoroundecanone-2, $CF_3COCF_2(CFClCF_2)_3CFClCF_2Cl$ | 10-keto-4,6,8-trichloroperfluoroundecene-1, $CF_3COCF_2(CFClCF_2)_3CF=CF_2$ |
| 7 | 1,2-epoxy-11,12-dichloroperfluorododecane, $\overset{O}{\overset{\diagup\diagdown}{CF_2-CF}}(CF_2)_8CFClCF_2Cl$ | 11,12-dichloroperfluorododecanone-2, $CF_3CO(CF_2)_8CFClCF_2Cl$ | 11-ketoperfluorododecene-1, $CF_3CO(CF_2)_8CF=CF_2$ |
| 8 | 1,2-epoxy-12,13-dichloroperfluorotridecane, $\overset{O}{\overset{\diagup\diagdown}{CF_2-CF}}(CF_2)_9CFClCF_2Cl$ | 12,13-dichloroperfluorotridecanone-2, $CF_3CO(CF_2)_9CFClCF_2Cl$ | 12-ketoperfluorotridecene-1, $CF_3CO(CF_2)_9CF=CF_2$ |
| 9 | 1,2-epoxy-4,6,8,10,12,13-hexachloroperfluorotridecane, $\overset{O}{\overset{\diagup\diagdown}{CF_2-CF}}CF_2(CFClCF_2)_4CFClCF_2Cl$ | 4,6,8,10,12,13-hexachloroperfluorotridecanone-2, $CF_3COCF_2(CFClCF_2)_4CFClCF_2Cl$ | 12-keto-4,6,8,10-tetrachloroperfluorotridecene-1, $CF_3COCF_2(CFClCF_2)_4CF=CF_2$ |
| 10 | 1,2-epoxy-13,14-dichloroperfluorotetradecane, $\overset{O}{\overset{\diagup\diagdown}{CF_2-CF}}(CF_2)_{10}CFClCF_2Cl$ | 13,14-dichloroperfluorotetradecanone-2, $CF_3CO(CF_2)_{10}CFClCF_2Cl$ | 13-ketoperfluorotetradecene-1, $CF_3CO(CF_2)_{10}CF=CF_2$ |

The monomeric compounds of this invention are useful as solvents for selected organic polymers, particularly when mixed with up to one molar equivalent of water, i.e., as the partially or completely hydrated ketones. Thus, solutions of polyoxymethylenes, polyamides, and many condensation polymers can be made from mixtures of the monomeric compounds of this invention and up to one molar equivalent of water. The solutions are useful in the preparation of shaped objects, for example in the casting of films.

The polymers and copolymers of the monomeric compounds of this invention are compatible with many other polymers, particularly with fluorinated polymers, and they are useful as plasticizers for such polymers. They are useful in the formation of shaped articles including films and molded objects. The lower molecular weight polymers are further useful as adhesives and for the coating, binding and impregnation of fibrous materials including paper, wood and textiles.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Compounds of the formula $$CF_3\overset{O}{\overset{\|}{C}}CF_2(CFX)_nCF=CF_2$$

wherein X is selected from the class consisting of fluorine and chlorine and $n$ is an integer from 0–9, inclusive, with the proviso that when $n$ is 1, X is fluorine and when $n$ is 2–9, inclusive, at least 50% of the X groups are fluorine, and with the further proviso that any chlorine-bearing atom is at least one carbon atom removed from the terminal trifluorovinyl group and from any other chlorine-bearing atom.

2. Process for producing the compounds of claim 1 comprising
   (a) mixing the compound

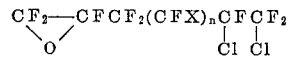

wherein X is selected from the class consisting of fluorine and chlorine, and $n$ is an integer from 0–9, inclusive, with the proviso that when $n$ is 1, X is fluorine and when $n$ is 2–9, inclusive, at least 50% of the X groups are fluorine, and with the further proviso that any chlorine-bearing atom is at least one carbon atom removed from any chlorine-bearing atom, with a catalyst selected from the group consisting of aluminum chloride, α-alumina, γ-alumina and hydrated aluminas, and (b) reacting the ketone formed in (a) with elemental zinc.

3. The process of claim 2 wherein (a) is conducted in the liquid phase at a temperature between 0 and 150° C. and (b) is conducted at a temperature of 50–125° C.

4. Polymers of the compounds of claim 1 selected from the group consisting of homopolymers, and copolymers with copolymerizable monomers represented by the formula $CFR^1=CR^2R^3$ wherein $R^1$, $R^2$ and $R^3$ are selected from the class consisting of hydrogen, fluorine, chlorine and bromine.

5. Copolymers of claim 4 wherein $R^1$, $R^2$ and $R^3$ are fluorine.

6. Copolymers of claim 4 wherein $R^1$ is fluorine and $R^2$ and $R^3$ are hydrogen.

7. 4-ketoperfluoropentene-1.

8. 4-chloro-6-ketoperfluoroheptene-1.

9. Process for producing a compound of the formula

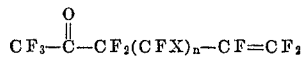

wherein X is selected from the class consisting of fluorine and chlorine, and $n$ is an integer from 0–9, inclusive, with the proviso that when $n$ is 1, X is fluorine and when $n$ is 2–9, inclusive, at least 50% of the X groups are fluorine, and with the further proviso that any chlorine-bearing atom is at least one carbon atom removed from any chlorine-bearing atom, which comprises (a) heating at a temperature between 50–250° C. in the vapor phase a compound of the formula

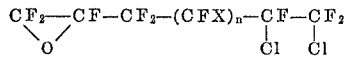

wherein $n$ and X are as defined above with a catalyst selected from the group consisting of aluminum chloride, α-alumina, γ-alumina and hydrated aluminas, and (b) heating the ketone formed in (a) with elemental zinc at a temperature of 50–125° C.

References Cited
UNITED STATES PATENTS
3,342,778   9/1967   Anderson _____ 260—63

WILLIAM H. SHORT, *Primary Examiner.*

L. LEE, *Assistant Examiner.*